(12) United States Patent
Hughes et al.

(10) Patent No.: US 7,791,765 B1
(45) Date of Patent: Sep. 7, 2010

(54) METHOD AND APPARATUS FOR OPTICAL DITHERING

(75) Inventors: John G. Hughes, Casselberry, FL (US);
Mark T. Myers, Orlando, FL (US);
Kevin F. Williams, Orlando, FL (US);
Jeff Cole, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 859 days.

(21) Appl. No.: 10/997,846

(22) Filed: Nov. 23, 2004

Related U.S. Application Data

(63) Continuation-in-part of application No. 10/429,052, filed on May 1, 2003, now abandoned.

(51) Int. Cl.
*H04N 1/40* (2006.01)
(52) U.S. Cl. ..................... 358/3.13; 358/468
(58) Field of Classification Search ....... 358/3.13–3.14, 358/1.7, 1.9, 2.1, 468
See application file for complete search history.

(56) References Cited

U.S. PATENT DOCUMENTS 4,324,475 A * 4/1982 Purdie ................. 356/519

| | | | |
|---|---|---|---|
| 4,961,627 A | 10/1990 | Swain et al. | |
| 6,332,576 B1 | 12/2001 | Colley et al. | |
| 6,707,443 B2 * | 3/2004 | Bruneau et al. | 345/156 |

OTHER PUBLICATIONS

"HST Dither Handbook", *Space Telescope Science Institute, Hubble Division, Version 2.0*, (Jan. 2002).
"Model SPC40-030A1 Dither Optical Scanner", Website, http://www.beissd.com, (Nov. 29, 2002),1.

* cited by examiner

*Primary Examiner*—Thomas D Lee
*Assistant Examiner*—Stephen M Brinich
(74) *Attorney, Agent, or Firm*—Jeffrey D. Myers; Samantha A. Updegraff; Timothy D. Stanley

(57) ABSTRACT

A method for optical dithering and a dither device comprising a mounting structure, a refractive optic, an optic mounting structure surrounding the optic, and one or more linear drive motors. Four linear coils are preferably employed together with a control system operating in open loop mode. The dither device and method provides double resolution to a detector receiving output therefrom. The invention can operate in a single axis or in two axes.

20 Claims, 6 Drawing Sheets

METHOD AND APPARATUS FOR OPTICAL DITHERING

CROSS-REFERENCE TO RELATED APPLICATIONS

This application is a continuation-in-part application of U.S. patent application Ser. No. 10/429,052, entitled "Optical Dither Apparatus and Method", to Hughes et al., filed on May 1, 2003, and the specification thereof is incorporated herein by reference.

BACKGROUND OF THE INVENTION

1. Field of the Invention (Technical Field)

The present invention relates to apparatuses and method for optical dithering.

2. Background Art

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

An increasingly popular technique in ultraviolet ("UV"), optical, and infrared ("IR") imaging observations (including Forward Looking Infrared Radar ("FLIR") applications) involves the use of "dithering," or spatially offsetting a telescope or sensor by shifts that are generally small relative to the detector size, thereby moving the target to a number of different locations on the detector. Two of the main strategies involve offsets by integer pixels to facilitate the removal of bad pixels, and offsets by sub-integer pixels to improve spatial sampling of a point spread function (PSF).

The benefits of dithering include: (1) Dithering can reduce the effects of pixel-to-pixel errors in the flat-field or spatially varying detector sensitivity; (2) Integer shifts of a few pixels allow the removal of small scale detector defects such as hot pixels, bad columns, and charge traps from the image; and (3) Non-integral (sub-pixel) dithers allow the recovery of some of the information lost to undersampling by pixels that are not small compared to a point spread function. However, significant alignment overhead is associated with dithering, particularly in telescopic applications.

Dithering in the context of telescope observations is discussed in detail in A. M. Koekemoer, et al., *HST Dither Handbook Ver.* 2.0, chs. 1-3 (Baltimore, Space Telescope Science Institute, 2002). Mechanical dithering devices include BEI Precision Systems and Space Division's Model SPC40-030A1 Dither Optical Scanner. The present invention is of a low-cost, refractive, two axes mechanical dithering apparatus.

U.S. Pat. No. 4,961,627, entitled "Two-Axis Beam Steering Apparatus", to Swain et al., is directed to a device for steering a light beam which requires a window having a first flat side and a second convex side. The device also requires a secondary window, which is rotatable with respect to the first window, having a concave first side and a flat second side. The device of Swain et al. further requires that the first and second windows be spaced apart by a "desired gap" (Col. 1, line 31). Still further, the device of Swain et al. requires that a flexible seal be provided and that a fluid be disposed between the two windows. As such, the device disclosed by Swain et al. is not only intricate and costly to manufacture, but is also susceptible to leaking which renders the device inoperable.

U.S. Pat. No. 6,332,576, entitled "Dithering Assemblies for Barcode Scanners", to Colley et al. is directed to a device for dithering a laser beam, particularly those used for barcode scanners. The dithering device of Colley et al. uses a feedback system. However, Colley et al. disclose that the device can be "constructed without employing feedback to resonantly drive the dithering assembly provided that the drive force is sufficiently large to produce the maximum amplitude allowed by the travel stops under non-resonant conditions" (Col. 7, lines 37-41). The device of Colley et al. employs a movable mirror "for scanning an illumination beam of a barcode scanner" (Lines 2 and 3 of the Colley et al. Abstract). As such, the angle of the beam is shifted rather than simply linearly displaced. Further, the disclosure of Colley et al. is directed to moving a beam across a large span (e.g. the width of a bar code scan).

There is thus a present need for a method and apparatus which enables rapid linear displacement across a short distance, (e.g. ½ the distance between adjacent pixels in an optical array), without the added complexity of a feedback system.

SUMMARY OF THE INVENTION

Disclosure of the Invention

The present invention is of a method for optical dithering and a dither device comprising: a mounting structure; a refractive optic; a mounting structure surrounding the optic; and one or more linear drive motors. Although plastic optics can be used, and will provide desirable results, in a preferred embodiment, the optic comprises a glass selected from silicon glasses and germanium glasses. Four linear voice coils are preferably employed, together with a plurality of flexures and a plurality of mechanical stops (preferably with deformable tips). A control system commands the one or more linear drive motors, and preferably operates in open loop mode. The dither device and method preferably provides double resolution to a detector by rotation of the optic through a small angle, such that electromagnetic waves traveling there through are refracted and linearly displaced on a detector a distance of about one half to about one and one half the space between adjacent pixels of a detector, thus effectively "filling" the gap between the pixels upon alternate frame updates of the detector. Note that the tilt of the optic is typically a small angle (approximately 0.5 degrees), which results in a small displacement at the detector (approximately 0.001 inches). The optic can be rotated about a single axis or in two axes.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DESCRIPTION OF THE PREFERRED EMBODIMENTS

Best Modes for Carrying Out the Invention

The present invention is of a refractive two axes dither device comprising a fixed mounting structure, optic (preferably composed of a plastic or glass material, and most preferably a glass of silicon or germanium), optic mounting structure, linear drive motors (preferably four voice coils), flexures, and mechanical stops. The invention is particularly useful for dithering the Line of Sight ("LOS") of FLIR systems in either one or two axes, thereby augmenting (doubling) resolution. In FLIR systems, the invention is preferably placed between the detector and the last reimager of the system. The primary differences are the use of an open loop servo to rotate the optic (no feedback devices are required) and the use of optical refraction to translate the image on the detector a very small distance.

The present invention is driven open loop (i.e., without feedback) with two square waves in quadrature. No feedback is required making control very simple and low cost. The drive coils are preferably cross-coupled. A is in series with –D and B is in series with –C for the following configuration of motors A, B, C, D, with plus signifying into the page:

A B
C D
(A−D)+(B−C)=top edge into page;
−(A−D)+(B−C)=right edge into page;
−(A−D)−(B−C)=bottom edge into page; and
(A−D)−(B−C)=left edge into page.

Because the invention is preferably refractive, the LOS displacement is a fraction of the window motion. The amount of image motion is preferably controlled by the window thickness and the material's index of refraction independent of the window motion. By controlling the dither of the image in this manner, the mechanical tilt can be larger than the desired image motion, thus making the dither motion relatively insensitive to mechanical tolerancing. The invention is smaller, of lower complexity, lower power, and lower cost than existing devices.

Figure 1:
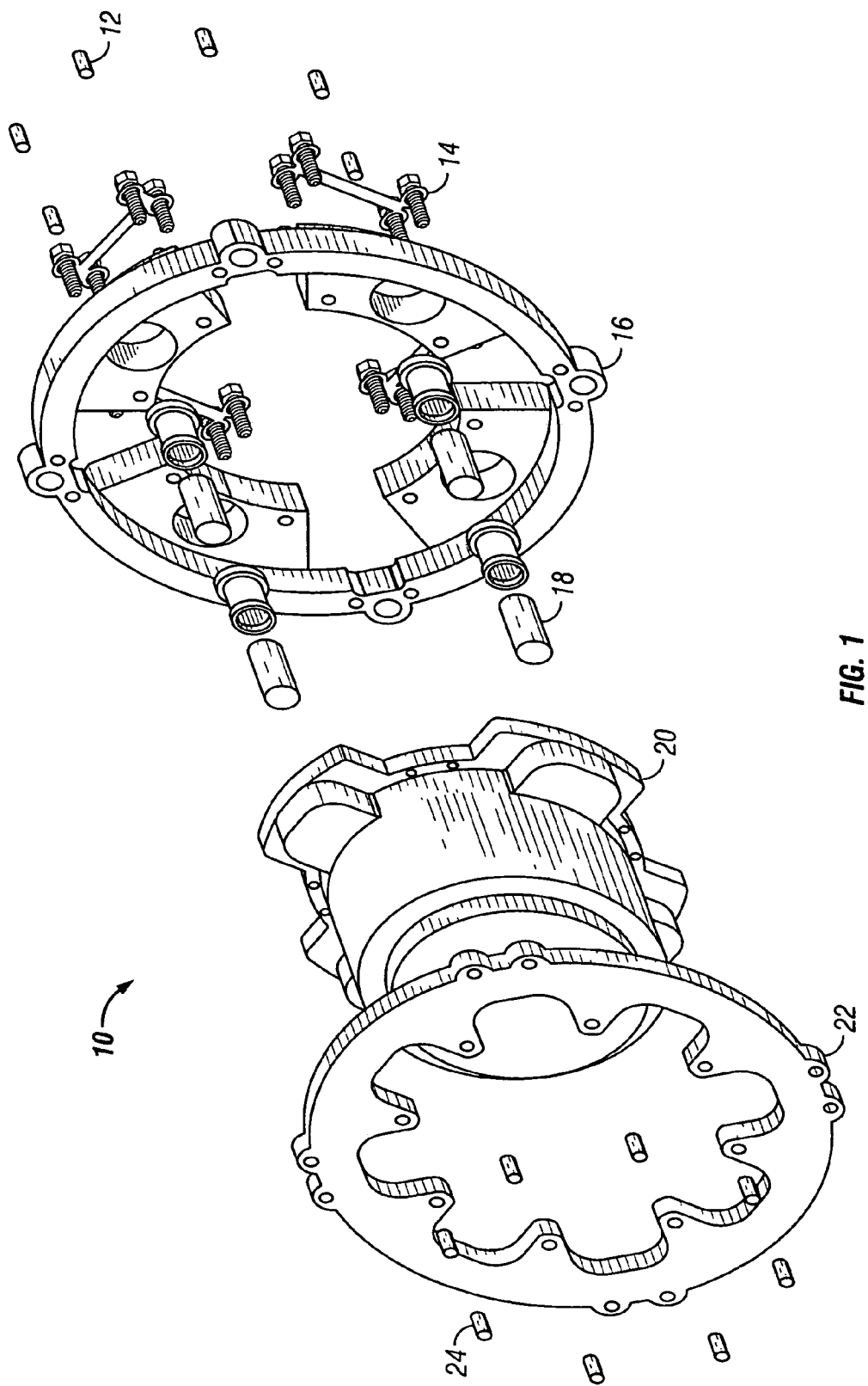
FIG. 1 is an exploded view of the preferred dither apparatus of the invention.

The preferred embodiment of the apparatus 10 of the invention is shown in front perspective exploded view in FIG. 1. The apparatus preferably comprises back stops 12 (for tilt adjustment, preferably tipped in rubber or like deformable material), flexures 14 which act as pivoting members, mounting base 16, linear actuators 18, optic housing 20, front stop support 22, front stops 24 (again for tilt adjustment and tipped in rubber of like deformable material).

Figure 2A:
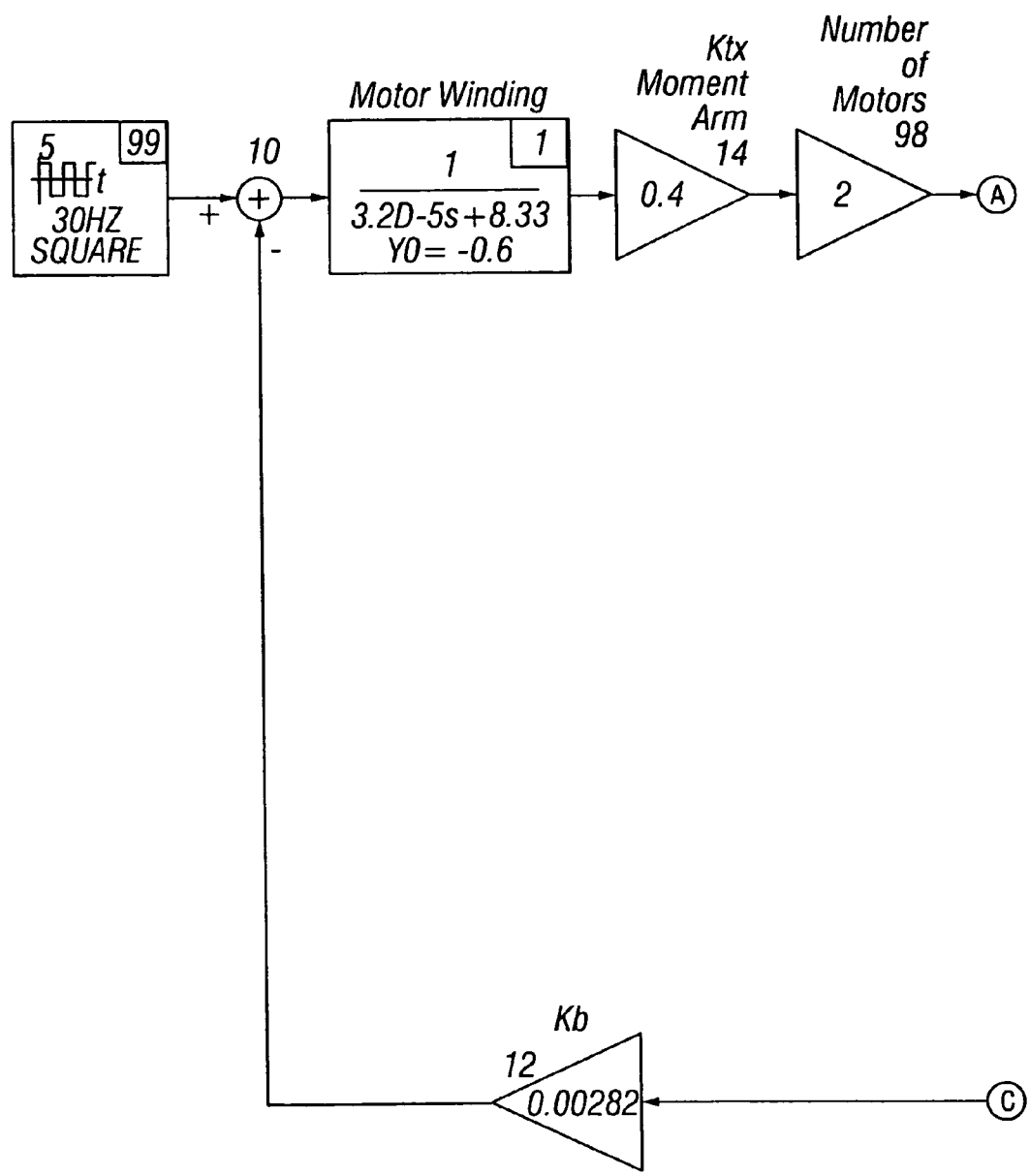
FIG. 2 is a schematic diagram of a control system for the invention for a two-axis dither.
Figure 2B:
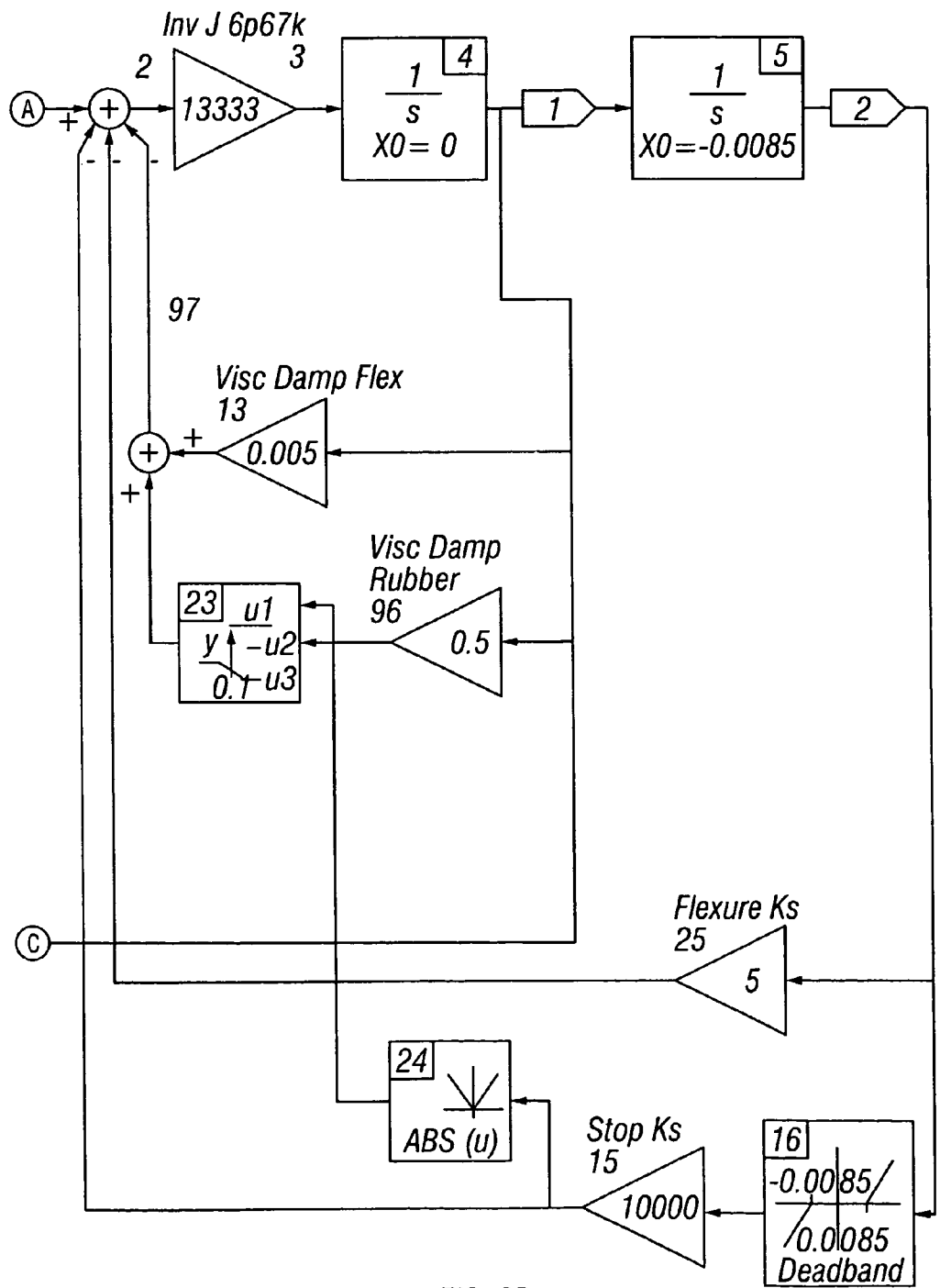

FIG. 2 is a block diagram of the preferred control apparatus to operate the invention in a FLIR system so as to provide two-axis dithering. FIG. 2 is also useful in performing a Matrixx/Matlab simulation of the invention. The invention is driven open loop, with voltage driven in quadrature. "Inv J" refers to the inverse of the inertia of the window/lens housing. "Visc Damp Flex" provides a dampening term for the flexures and "Visc Damp Rubber" for rubber tips on the stops. "Flexure Ks" provides the flexure spring rate and "Stop Ks" the stop spring rate, which is preferably set quite high as shown. The deadband block provides for approximately ½ degree of motion before a stop is hit. Output 1 provides cell velocity in radians/sec and output 2 provides position in radians.

Figure 3:
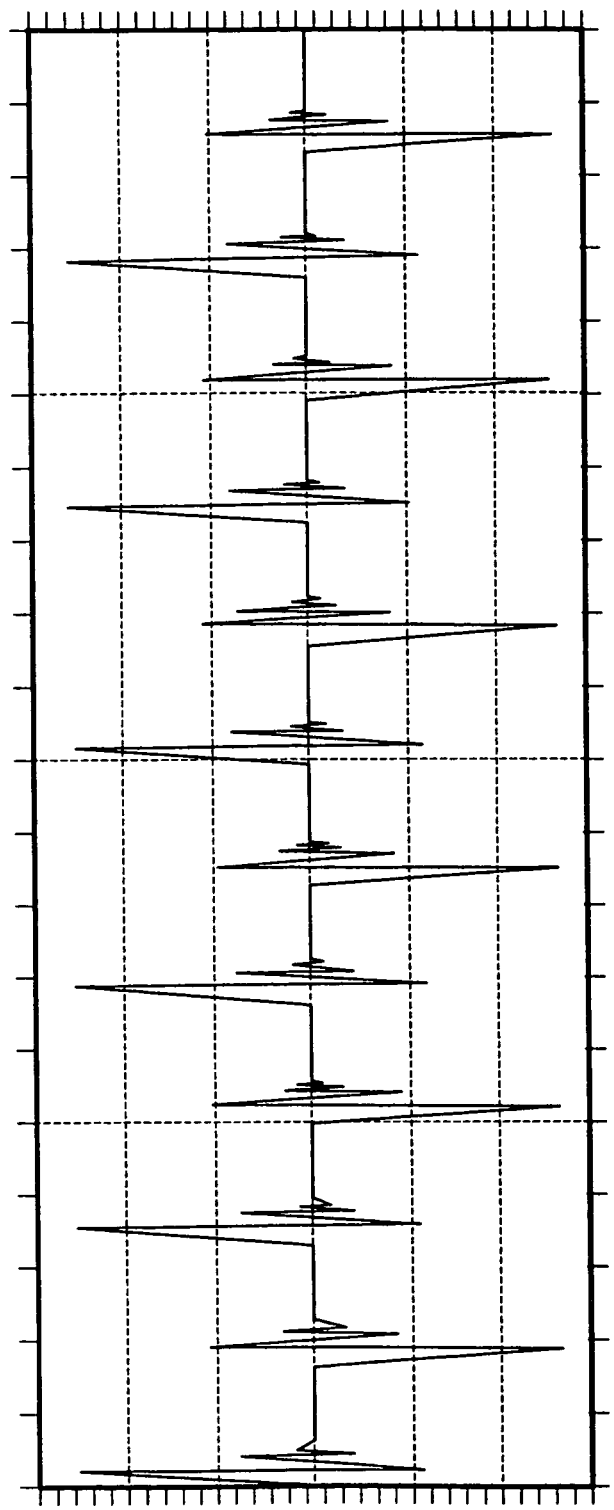
FIG. 3 is a graph of velocity of the invention when in use in radians/second.
Figure 4:
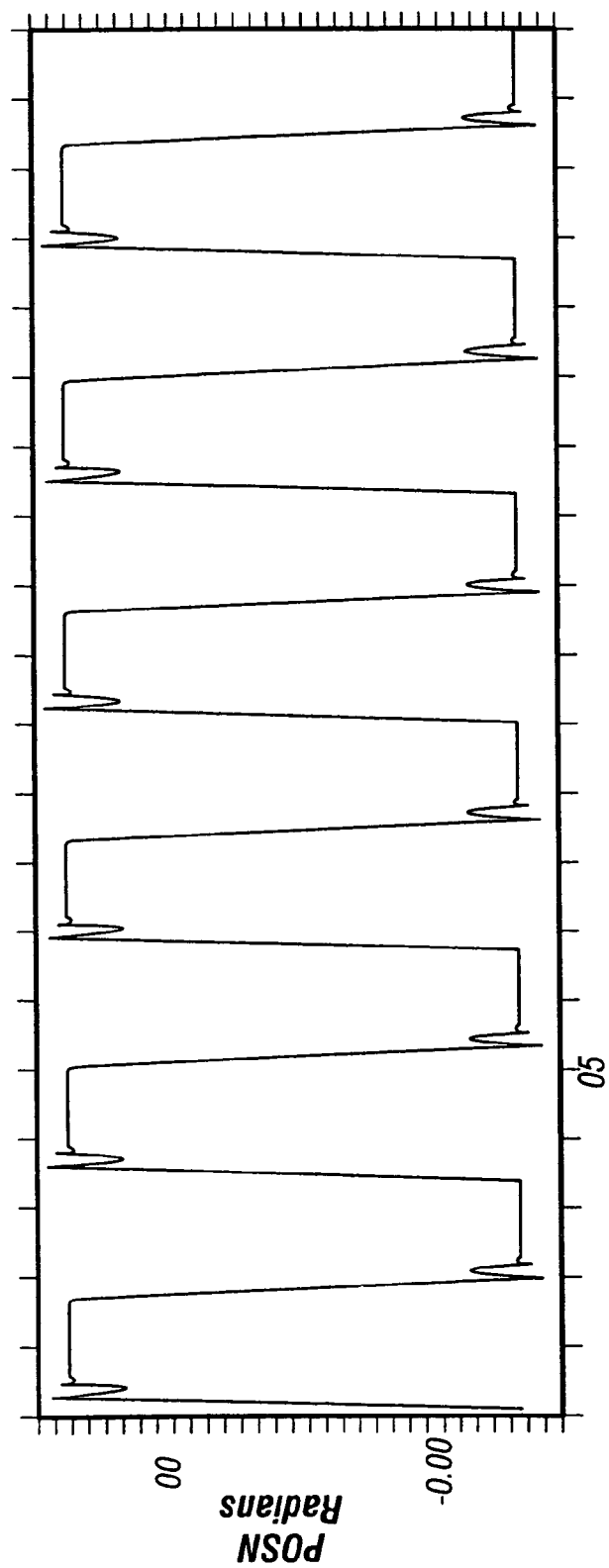
FIG. 4 is a graph of position of the invention when in use in radians.

FIGS. 3 and 4 illustrate the velocity and position of the apparatus provided by the control system of FIG. 2. Note that position and velocity settling are very fast, thereby yielding a high scan efficiency.

Figure 5:
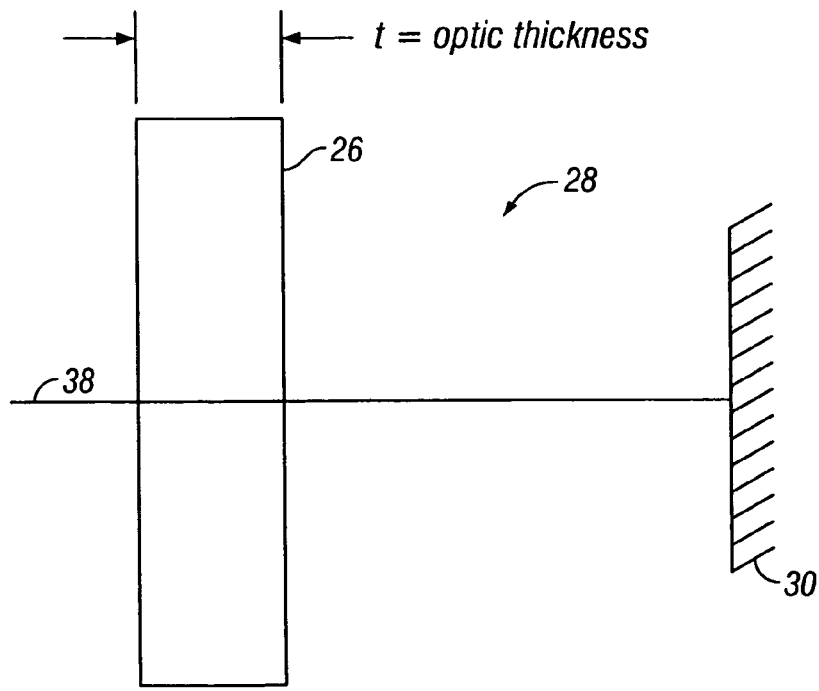
FIG. 5 is a schematic diagram of the basic elements of the present invention wherein an optic of the present invention has not been tilted.
Figure 6:
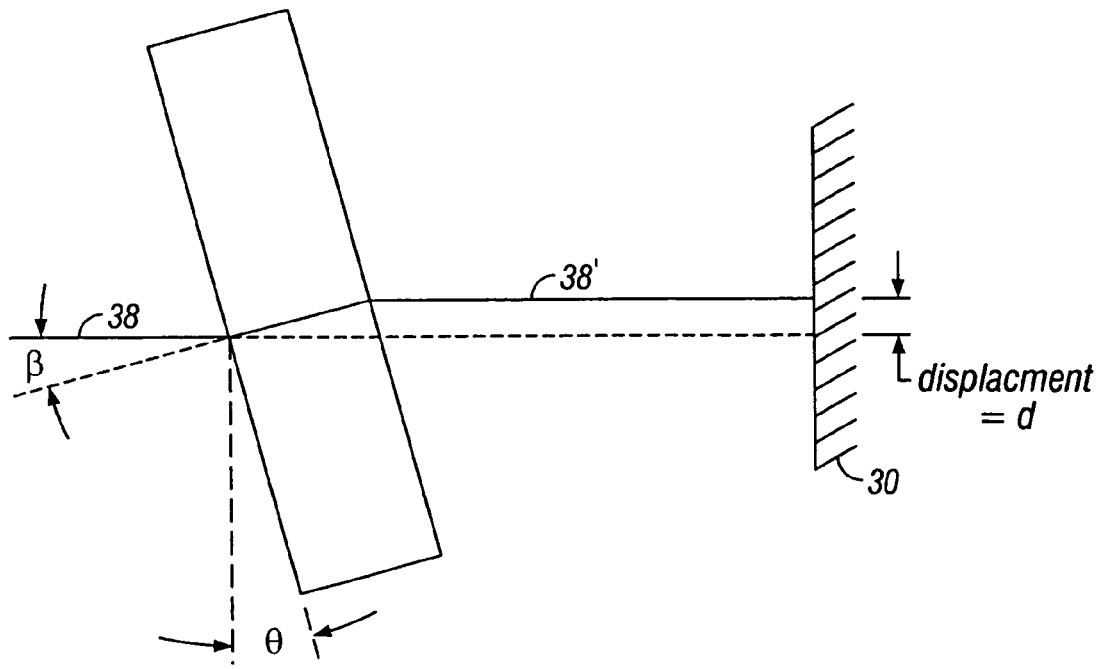
FIG. 6 is a schematic diagram depicting an optic of the present invention which has been tilted.

Referring now to FIGS. 5 and 6, optical member 26, having refractive index of η and a thickness of t, is shown before and after rotation (FIGS. 5 and 6 respectively). As depicted therein, beam 38 passes through member 26 with no refraction when member 26 is not rotated. Beam 38 experiences no displacement on a surface of detector 30. When optical member 26 has been rotated θ degrees (the optical tilt), however, beam 38 is displaced distance d on a surface of detector 30. As depicted in FIG. 6, β is the angle between normal of the optic and the principal axis of the optical apparatus of the present invention, and is determined by Equation 1.

$$\beta = \sin^{-1}(N/\eta)(\sin\theta) \quad \text{Equation 1.}$$

Further, the magnitude of displacement, d is determined by Equation 2.

$$d = t \,(\sin\,\theta)\left[\left(1 - \frac{N\,\cos\,\theta}{\eta\,\cos\,\beta}\right)\right] \quad \text{Equation 2}$$

N is the index of refraction for surrounding medium 28.

Accordingly, the present invention provides dithering according to the above equations by tilting the optic with the liner actuators. The solution is elegant and provides for low cost, high robustness optical devices using dithering.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A dither device comprising:
   a mounting structure;
   a refractive optic comprising only substantially flat surfaces through which an image to be dithered passes and said refractive optic disposed within said mounting structure;
   a control system to provide dithering of said image;
   one or more linear drive motors causing tilting of said refractive optic as directed by said control system; and
   wherein said dithering is achieved without an interaction between a plurality of optics.

2. The device of claim 1 wherein said optic comprises a material selected from the group consisting of glasses and plastics.

3. The device of claim 2 wherein said glasses are selected from the group consisting of silicon glasses and germanium glasses.

4. The device of claim 1 wherein said linear drive motors comprise linear voice coils.

5. The device of claim 1 additionally comprising a plurality of flexures and a plurality of mechanical stops for said refractive optic.

6. The device of claim 5 wherein said plurality of mechanical stops comprise deformable tips.

7. The device of claim 1 wherein said control system operates in open loop mode.

8. The device of claim 1 wherein said optic is rotated such that electromagnetic waves traveling therethrough are linearly displaced a distance of about one half or about one and a half the distance between adjacent pixels of a detector.

9. The device of claim 1 wherein said optic is rotated about a single axis.

10. The device of claim 1 wherein said optic is rotated about two axes.

11. A method of optical dithering comprising:
providing a mounting structure;
providing a refractive optic positioned such that an image to be dithered passes through only substantially flat surfaces of the optic;
disposing the refractive optic within the mounting structure;
dithering an image by moving the refractive optic via one or more linear drive motors as determined by a dithering control system; and
achieving the dithering without an interaction between a plurality of optics.

12. The method of claim 11 wherein the optic comprises a material selected from the group consisting of glasses and plastics.

13. The method of claim 12 wherein the glasses comprise an element selected from the group consisting of silicon glasses and germanium glasses.

14. The method of claim 11 wherein moving comprises moving the refractive optic via a plurality of linear coils.

15. The method of claim 11 additionally comprising providing a plurality of flexures and a plurality of mechanical stops for the refractive optic.

16. The method of claim 14 wherein the plurality of mechanical stops have deformable tips.

17. The method of claim 11 wherein the control system operates in open loop mode.

18. The method of claim 11 further comprising rotating the optic such that electromagnetic waves refracted therethrough are displaced about one half or about one and a half the distance between adjacent pixels of a detector.

19. The method of claim 11 further comprising rotating the optic about a single axis.

20. The method of claim 11 further comprising rotating the optic about two axes.

* * * * *